United States Patent
Lesniak

[11] Patent Number: 6,055,053
[45] Date of Patent: Apr. 25, 2000

[54] FULL FIELD PHOTOELASTIC STRESS ANALYSIS

[75] Inventor: Jon R. Lesniak, Madison, Wis.

[73] Assignee: Stress Photonics, Inc., Madison, Wis.

[21] Appl. No.: 08/867,475

[22] Filed: Jun. 2, 1997

[51] Int. Cl.$^7$ .............................. G01J 4/00; G01B 11/18
[52] U.S. Cl. .......................... 356/366; 356/34; 356/381; 356/365; 73/800
[58] Field of Search ................................ 356/33, 34, 32, 356/35, 364, 365–369, 381, 382; 73/800

[56] References Cited

U.S. PATENT DOCUMENTS

| | | | |
|---|---|---|---|
| 3,034,342 | 5/1962 | Riegner | 73/88 |
| 3,062,087 | 11/1962 | Zandman et al. | 356/33 |
| 3,067,606 | 12/1962 | Oppel | 73/88 |
| 3,178,934 | 4/1965 | O'Regan | 73/88 |
| 3,345,905 | 10/1967 | Acloque | 88/14 |
| 3,373,652 | 3/1968 | Flader | 356/33 |
| 3,495,912 | 2/1970 | Hooper et al. | 356/114 |
| 3,560,955 | 2/1971 | Hallman | 356/365 |
| 3,580,681 | 5/1971 | Paris et al. | |
| 3,589,812 | 6/1971 | Robert et al. | 356/33 |
| 3,620,589 | 11/1971 | Dudderar et al. | 350/3.5 |
| 3,811,775 | 5/1974 | Abu-Saud | 356/35 |
| 3,902,805 | 9/1975 | Redner | 356/33 |
| 4,176,951 | 12/1979 | Robert et al. | 356/33 |
| 4,179,217 | 12/1979 | Robert et al. | 356/33 |
| 4,320,966 | 3/1982 | Reytblatt | 356/34 |
| 4,523,848 | 6/1985 | Gorman et al. | 356/35 |
| 4,703,918 | 11/1987 | Pindera | 356/35 |
| 4,777,358 | 10/1988 | Nelson . | |
| 4,914,487 | 4/1990 | Croizer et al. | |
| 5,040,871 | 8/1991 | Davies et al. | 359/458 |
| 5,177,555 | 1/1993 | Stratton et al. | 356/35.5 |
| 5,184,624 | 2/1993 | Brown et al. | 128/734 |
| 5,270,781 | 12/1993 | Singh et al. | 356/32 |
| 5,288,995 | 2/1994 | Strachan | 250/227.12 |
| 5,298,964 | 3/1994 | Nelson et al. | 356/33 |
| 5,305,090 | 4/1994 | Kowalski | 356/366 |
| 5,394,752 | 3/1995 | Reda | 73/800 |
| 5,400,131 | 3/1995 | Stockley et al. | 356/33 |
| 5,410,917 | 5/1995 | Giversen et al. | 73/800 |
| 5,422,977 | 6/1995 | Patterson et al. | 395/2.85 |
| 5,424,834 | 6/1995 | Akedo et al. | 356/371 |

FOREIGN PATENT DOCUMENTS

778460 A2  11/1997  European Pat. Off. .

OTHER PUBLICATIONS

"Towards full filed automated photoelastic analysis of complex components"—Patterson et al., Dept. of Mechanical and Process Engineering, University of Sheffield, Mappin Street, Sheffield—May 1991.

"Automated photoelastic analysi"—Patterson—Dept. of Mechanical Engineering, University of Sheffield, Sheffield—Feb. 1988.

(List continued on next page.)

*Primary Examiner*—Hoa Q. Pham
*Attorney, Agent, or Firm*—Lathrop & Clark LLP

[57] ABSTRACT

A structural specimen coated with or constructed of photoelastic material, when illuminated with circularly polarized light will, when stressed; reflect or transmit elliptically polarized light, the direction of the axes of the ellipse and variation of the elliptically light from illuminating circular light will correspond to and indicate the direction and magnitude of the shear stresses for each illuminated point on the specimen. The principles of this invention allow for several embodiments of stress analyzing apparatus, ranging from those involving multiple rotating optical elements, to those which require no moving parts at all. A simple polariscope may be constructed having two polarizing filters with a single one-quarter waveplate placed between the polarizing filters. Light is projected through the first polarizing filter and the one-quarter waveplate and is reflected from a sub-fringe birefringent coating on a structure under load. Reflected light from the structure is analyzed with a polarizing filter. The two polarizing filters and the one-quarter waveplate may be rotated together or the analyzer alone may be rotated. Computer analysis of the variation in light intensity yields shear stress magnitude and direction.

28 Claims, 4 Drawing Sheets

OTHER PUBLICATIONS

Felix Zandman et al., Photoelastic Coatings, pp. 7–30.

F.W. Hecker and B. Morche, "Computer–Aided Measurement of Relative Retardations in Plane Photoelasticity," Experimental Stress Analysis, Proc. Of the VIIIth Int. Conf. On Exp. Stress Analysis, 1986, pp. 535–542.

A.J. Robert, "New Methods in Photoelasticity," Experimental Mechanics, May 1967, pp. 224–232.

A. Ajovalasit, S. Barone, G. Petrucci, "Automated Photoelasticity in White Light: Influence of Quarter–Wave Plates," J. of Strain Analysis, vol. 30, No. 1, 1995, pp. 29–34.

C. Quan, P.J. Bryanston–Cross, T.R. Judge, "Photoelasticity Stress Analysis Using Carrier Fringe and FFT Techniques," Optics and Lasers in Engineering, 1993, Elsevier Science Publishers, Ltd., England, pp. 79–108.

S. Redner, "New Automatic Polariscope System," Experimental Mechanics, Dec. 1974, pp. 486–491.

A.S. Voloshin and A.S. Redner, "Automated Measurement of Birefringence: Development and Experimental Evaluation of Techniques," Experimental Mechanics, Sep. 1989, pp. 252–257.

S. Redner, "Compensation Method Using Synchronized Polarizer–Analyzer Rotation," Experimental Mechanics, Jun. 1976, pp. 221–225.

H. Fessler, R.E. Marston, E. Ollerton, "A Micropolariscope for Automatic Stress Analysis," Jrnl. Of Strain Analysis, vol. 22, No. 1, 1987, pp. 25–35.

J. Sirkis, Y. Chen, H. Singh, A.Y. Cheng, "Computerized Optical Fringe Pattern Analysis in Photomechanics: A Review," Optical Engineering, Feb. 1992, vol. 31, No. 2, pp. 304–314.

R.K. Müller, L.R. Saackel, "Complete Automatic Analysis of Photoelastic Fringes," Experimental Mechanics, Jul 1979, pp. 245–251.

A.S. Voloshin, C.P. Burger, "Half–Fringe Photoelasticity: A New Approach to Whole–Field Stress Analysis," Experimental Mechanics, Sep. 1983, pp. 304–313.

FULL FIELD PHOTOELASTIC STRESS ANALYSIS

LICENSE RIGHTS

The U.S. Government has a paid-up license in this invention and the right in limited circumstances to require the patent owner to license others on reasonable terms as provided for by the terms of Contract No. NAS1-97036 awarded by the National Aeronautics and Space Administration.

FIELD OF THE INVENTION

The present invention relates to apparatus and methods for detecting strain in objects in general, and apparatus and methods employing photoelastic techniques to detect strains indicative of shear stresses in particular.

BACKGROUND OF THE INVENTION

Proper design of a load carrying structure requires attention to the cost, weight, and durability of the structure. Effective design requires an understanding of the loads and deflection which the structure undergoes during its lifetime. With highly engineered parts the very feasibility of a machine or structure may require advanced design techniques.

Computer based mathematical structural models of structures, such as those employing Finite Element Analysis (FEM), are widely used to help the designer simulate structures and imposed loads. While often helpful, a mathematical model is only as good as the correlation between the model equations and the real world. To test this correlation, designers must fabricate real parts and subject them to physical loads. The results of experiments on real world test structures are used to improve the mathematical models. Comparison of the physical results to those predicted by the mathematical model aids the designed in developing equations and constants which more closely model the real world.

The classical approach to determining stresses within a structure in the real world is to apply strain gauges to the object and measure the induced strains when the structure is loaded. Strain gauges, while accurate, provide information only about a limited number of points on the structure and do not allow easy visualization of the stresses produced in a structure.

Recently, new techniques that allow rapid capture of full field stresses over the surface of an entire structure or portion of a structure have been developed. These techniques such as Thermoelastic Stress Analysis (TSA) have allowed tension and compression loads to be rapidly determined for every point on a structure. These new techniques allow visualization of the imposed strains and displacement in objects being tested.

The structural analysis technique known as Photoelastic Stress Analysis (PSA) has been recognized as having great potential because it can be used to determine shear stresses within a structure directly.

Thermoelastic Stress Analysis detects minute changes in temperature due to compression or expansion of a structure. Expansion and compression correspond to tensile and compressive forces within a structure. Shear stresses must be derived from a knowledge of the observed tensile and compressive forces. Photoelastic Stress Analysis which can provide direct imaging of shear stresses thus provides the missing ingredient to complete characterization of a loaded structure. In addition Photoelastic Stress Analysis can be performed by statically loading a structure. In many cases statically loading a structure will be significantly less costly than the dynamic loading required for Thermoelastic Stress Analysis. Maximum understanding of a structure is achieved by employing both TSA and PSA.

PSA is based on the observation that some materials respond to stress by increasing the speed of light through the material along the plane of the imposed stress. The orientation of the increased speed of light is referred to as the fast axis. A slow axis is defined perpendicular to the fast axis. Where the principal stresses are unequal in magnitude, or differ in sign, such materials exhibit birefringence. Birefringence is a property of an optically transparent material which causes the velocity of light through the material to vary depending on the vibrational plane of the light. The amount of birefringence present in an object is proportional to the difference between the principal stresses, which defines the shear stresses within the object. To apply Photoelastic Stress Analysis techniques, a test model must be constructed of, or coated with, a birefringent material.

When plane polarized light from a first polarizer passes through a birefringent material in which the fast axis is tilted with respect to the axis of the polarized light, the polarized light is resolved into two perpendicular components, a first component along the fast axis and a second component along the slow axis, thereby producing two components of the linearly polarized light which are separated in time. When the fast axis and slow axis components are viewed through a second polarizing filter, referred to as an analyzer, which is arranged perpendicular to the orientation of the first polarizer, a component of each of the first and second components will be able to pass through the second polarizing filter or analyzer. Because the first and second components which pass through the birefringent material are separated in time they are not fully recombined by the analyzer but each component is resolved into a portion which is parallel to the analyzer and thus can pass through the analyzer.

This type of optical system employing two orthogonally oriented plane polarizing filters: a polarizer and an analyzer, is known as a dark field plane polariscope. Any birefringence exhibited by the object placed between the crossed polarizing filters results in light passing through the polariscope. A similar device uses plane polarizing filters which are oriented with their planes of polarization parallel, and is referred to as a bright field linear polariscope. The presence of a birefringent object between the parallel polarizing filters results in some light not passing through the filters.

Loading of an object can create induced birefringence, which, when viewed through the plane polariscope, forms two sets of fringes. The first set of fringes, referred to as isoclinics, demarcate portions of the object where one of the principal stress directions is parallel to the axis of the polarizer. The second set of fringes, referred to as isochromatics, demarcate portions of the object where the difference of the principal stresses is zero or where the stress is of sufficient magnitude to retard the transmission of light by a whole number of wavelengths.

The isochromatic fringes may be viewed alone by eliminating the isoclinic fringes by passing the beam through a circular polariscope.

A circular polariscope consists of two polarizing filters and two one-quarter waveplates positioned between the polarizing filters. Again the polarizing filters may be arranged so that the planes of polarization are parallel, to produce a light field polariscope, or are perpendicular, to produce a dark field polariscope.

The isoclinic fringes are eliminated because the first one-quarter waveplate produces circularly polarized light in which the light no longer has a single axis of polarization, instead the axis of polarization rotates. The second one-quarter waveplate converts the beam back into linearly polarized light.

Photoelastic stress analysis suffers from a number of limitations which limit its usefulness. In order for the technique to be applied to a structure the structure must be constructed of a birefringent material or coated with a birefringent coating of a known thickness.

Constructing the structure of birefringence materials, which for practical reasons are typically low strength plastics, have inherent limitations when attempting to verify the structural response of high strength metals and composite structures. On the other hand, applying a coating to a structure has in the past required molding a layer of photoelastic plastic to the shape of the structure and then bonding the photoelastic layer to the structure. This technique is time consuming and requires considerable skill to avoid pre-stressing the plastic layer. Other techniques of coating the structure such as spraying or painting result in an uneven coating. Any nonuniformity in the coating thickness results in a proportional error in the measured stresses. Further spray on coating result in insufficient birefringence to apply classical photoelastic techniques with reasonable resolution.

Another problem with photoelastic stress analysis is that to determine stress at a particular point the number of fringes between a non stressed portion of the structure and the particular point must be counted. This makes the determination of the magnitude of the stresses in the structure subject to errors in counting the fringes or choosing a starting point for counting the fringes. The difficulty in accurately counting the number of fringe lines present can be overcome by choosing the thickness of the coating so the stresses produce less then a single fringe.

With this technique the changes in stress levels are represented by a brightness intensity within a single fringe band. However, known techniques for viewing the stress induced brightness level can not readily distinguish between minimum and maximum axes of stress.

What is needed is a photoelastic coating technique and a photoelastic analyzing technique and apparatus which produces full field determination of shear stress magnitude and direction.

SUMMARY OF THE INVENTION

A structural specimen coated with or constructed of photoelastic material, when illuminated with circularly polarized light will, when stressed; reflect or transmit elliptically polarized light, the direction of the axes of the ellipse and variation of the elliptically polarized light from illuminating circular polarized light will correspond to and indicate the direction and magnitude of the shear stresses for each illuminated point on the specimen.

The principles of this invention allow for several embodiments of stress analyzing apparatus, ranging from those involving multiple rotating optical elements, to those which require no moving parts at all. The rotating optic apparatus will be discussed first, with the conceptually more advanced non-moving part devices discussed later.

A simple polariscope may be constructed having two polarizing filters with a single one-quarter waveplate placed between the polarizing filters. Light is projected through the first polarizing filter and the one-quarter waveplate and is reflected from a sub-fringe birefringent coating on a structure under load. Reflected light from the structure is analyzed with a polarizing filter. The two polarizing filters and the one-quarter waveplate may be rotated together or the analyzer alone may be rotated.

An image of the structure taken through the polariscope can be captured by a camera and analyzed by a computer. For each rotation of the polariscope each pixel in the image corresponding to a location on the structure shows a time dependent light curve with minimum and maximum intensity which exhibits a frequency twice that of the rotation rate of the polariscope. The maximum intensity correlates with the maximum stress amplitude. The phase angle between a reference position of the polariscope and the maximum and minimum intensity positions defines the orientation of the axes of maximum and minimum shear stress.

In order to observe birefringence on a structure under load a birefringent coating of known thickness must be applied to the structure before it is loaded.

Two techniques are disclosed. The first technique employs a spray-on coating which contains a known amount of one or more dyes. The coating as modified by the dyes produces known but differing attenuation of each of to three selected wavelengths of light. The structure is illuminated with white light or light containing all three wavelengths. And the thickness of the coating is derived from the relative attenuation of the different wavelengths of light.

The second technique utilizes a transparent oxide such as a clear anodized coating on aluminum. If the chemical process used to produce the coating inherently produces a coating of uniform thickness, measuring the coating thickness is not necessary.

It is a feature of the present invention to provide an apparatus and a technique for determining full field shear stresses in an object subjected to a load.

It is a further feature of the present invention to provide an apparatus for using photoelastic methods which requires no moving parts and can be calibrated and aligned in software.

It is another feature of the present invention to provide a polariscope which can determine the orientation of the principal axes of stress of an illuminated specimen.

It is a further feature of the present invention to provide an aid for the design of structures which does not require a load frame capable of cyclical loading of the structure.

It is a still further feature of the present invention to provide a coating and coating method which improves accuracy and cost effectiveness for photoelastic stress analysis.

It is a yet further feature of the present invention to provide a photoelastic coating which does not relax over time.

It is a yet further feature of the present invention to provide a new technique for determining shear stress direction and magnitude by utilizing the principles of photoelasticity.

Further objects, features and advantages of the invention will be apparent from the following detailed description when taken in conjunction with the accompanying drawings.

DESCRIPTION OF THE PREFERRED EMBODIMENTS

Figure 1:
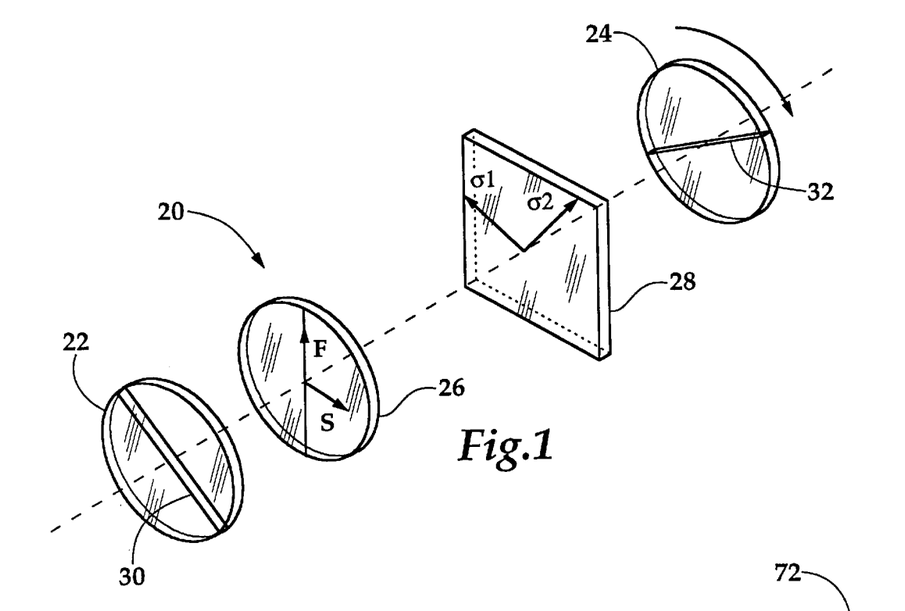
FIG. 1 is a schematic view of a stress analyzing optical path of a photoelastic stress analyzer of this invention for use with a light transmissive specimen.

Referring more particularly to FIGS. 1–15 wherein like numbers refer to similar parts, a grey field polariscope 20 is shown in FIG. 1. The grey field polariscope 20 has three optical elements: a first plane polarizing filter or polarizer 22, a second plane polarizing filter or analyzer 24, and a one-quarter offset waveplate 26 positioned between the polarizer 22 and the analyzer 24. The three optical elements may be all mechanically or electrically linked so as to rotate together at a constant angular velocity $\omega$, however only the analyzer 24 is required to rotate. A specimen 28 which exhibits birefringence due to an imposed load is positioned between the offset waveplate 26 and the analyzer 24.

A structural specimen 28 is constructed of photoelastic material and is illuminated with circularly polarized light created by passing polarized light through the quarter waveplate 26. When the specimen is stressed it will transmit elliptically polarized light the variation in light intensity from the grey field and orientation of the axes of which will correspond to and indicate the maximum shear stress and the orientation of the principal stresses for each illuminated point on the specimen.

A minimum delay axis is defined for a birefringent material along which light passes through the material with minimum delay. Along an axis perpendicular to the axis of minimum delay light is subjected to the maximum retarding effect.

Index of refraction is defined as the ratio between the speed of light in a vacuum and the speed of light in a material. In certain materials the index of refraction, that is, the speed with which light travels through the material, depends on the orientation of the vibrational plane of the light with respect to orientation of the atoms making up the material. For example when ordinary light passes through a calcite crystal along a particular crystallographic axis the strong birefringence exhibited by the crystal resolves the light into two polarized images. These images are spatially separated as the light which is experiencing the higher index of refraction experiences greater refraction.

Birefringent materials of interest for photoelastic stress analysis respond to stress by exhibiting birefringence where the index of refraction is minimized and the speed of light is maximized for light vibrating in a plane parallel to the axis of maximum applied stress. The axis of minimum normal stress is oriented 90 degrees from the axis of maximum applied stress and light vibrating in a plane parallel to the minimum normal stress is retarded with respect to light traveling parallel to the axis of maximum applied stress.

A birefringent material resolves any light passing through it into two polarized orthogonal components which are separated in time from each other. If two polarizers such as shown in FIG. 1 are considered without the one-quarter waveplate 26 they would constitute a dark field polariscope because the polarizers 22 and 24 are arranged with their axes of polarization 30, 32 perpendicular to each other and if there are no birefringent elements between them, no light will pass through both polarizers.

When a birefringent specimen 28 having a fast axis $\sigma_1$ and a slow axis $\sigma_2$ is interposed between the elements of a conventional dark field, polarized light parallel to the axis 30 will be resolved into a component lying along the fast axis $\sigma_1$ and a component lying along the slow axis $\sigma_2$. Because the two components are separated in time they are not fully recombined at the analyzer 24 but are instead resolved by the analyzer into a component of light parallel to the analyzer axis 32 which then passes through the analyzer 24.

A typical birefringent specimen as used in conventional photoelastic stress analysis, will under even moderate loading produce a difference in the apparent length of the light path through the specimen of many wavelengths of light. Because the phenomenon we are dealing with depends only on the phase difference between the light traveling along the slow axis and along the fast axis the brightness of a point on the specimen is not affected by the whole number of wavelengths in apparent path length between the slow and fast axes of the specimen.

As the stress increases at a particular point the phase angle between light traveling along the slow axis and the fast axis in the specimen will reach a maximum when the two waveforms are 180 degrees out of phase. By keeping the total birefringence to less then one-half a wavelength of light, brightness of a point on a specimen correlates to absolute stress magnitude. And, as discussed below, when using a one-quarter waveplate it will be desirable to keep the total birefringence to one-quarter of a wave or a phase difference of ninety degrees.

In most circumstances for a light transmissive specimen, keeping the total birefringence to less that a quarter of a wavelength of light is impractical. However by using a thin birefringent coating on a specimen it is possible to keep the total birefringence to one-quarter of a wavelength. Furthermore, by using the techniques of this invention, it is possible to image birefringent specimens with multiple wavelengths of induced birefringence. For simplicity of discussion the case of a transmission specimen with total birefringence of less than one-quarter wavelength is discussed before turning to more practical embodiments of my invention.

As shown in FIG. 1, two polarizers arranged with perpendicular axes of polarization constitute a plane polariscope. In a plane polariscope both the polarizer 22 and the analyzer rotate together. If the elements of a plane polariscope are rotated, each point on the specimen 28 will appear with maximum brightness when the axis 32 of the analyzer is oriented forty-five degrees from to the fast axis $\sigma_1$ or the slow axis $\sigma_2$ which angular position will occur twice for each axis as the analyzer is rotate for a total of four times (4 $\omega$) for each rotation of the polarizer and the analyzer. If the specimen has only sufficient birefringence to create less than one-quarter wavelength of light retardation, the level of stress within the object 28 will be viewable as a brightness level.

Figures 3, 4, 5:
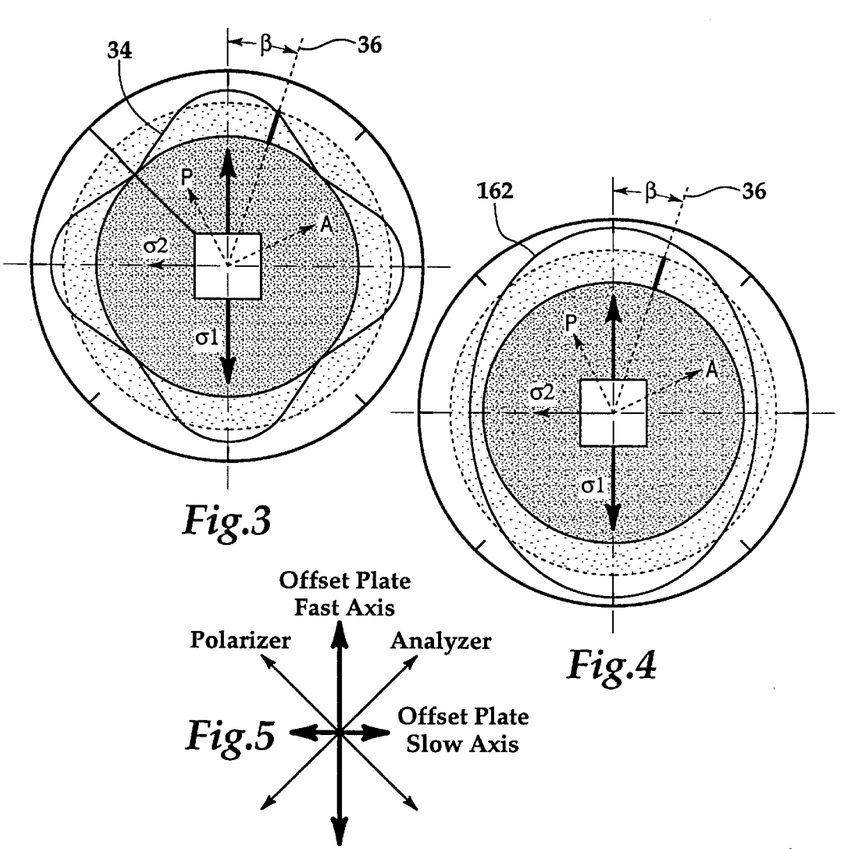
FIG. 3 is a schematic view of the light intensity variation produced by a conventional plane polariscope.
FIG. 4 is a schematic view of the light intensity variation produced by the grey field polariscope of FIGS. 1 and 2.
FIG. 5 is a schematic view of the relative orientation of the birefringent axes of the offset plate with respect to the polarizer and the analyzer of FIG. 1.

FIG. 3 illustrates the pattern of light intensity visible for a particular location on a specimen as the polarizer and analyzer of a plane polariscope are rotated once. The intensity of light visible through the analyzer is depicted by the four lobed curve 34. Each time the slow axis or the fast axis of a particular point on the specimen is aligned halfway between the axis 30 of the polarizer and the axis 32 of the analyzer the separation of light coming through the polarizer 22 into two time-separated components is maximized. The following Equation One describes the intensity of a point on the specimen as a plane polariscope is rotated.

$$I = a^2 \sin(\Delta/2) \sin^2(2\alpha)$$

I is the intensity of light at a selected point on the specimen
a is the amplitude of the source
$\alpha$ is the angle between the polarizer and the direction of principal stresses
$\Delta$ represents the relative retardation due to birefringence in the specimen Only $\alpha$ changes as a plane polariscope rotates, the relative retardation, $\Delta$ due to birefringence in the specimen is related to the state of stress of a point on the specimen and does not change for a given load condition. Intensity of light I is therefore maximized when 2$\alpha$ is maximized, which, for the sine function, occurs when $\alpha$ equals forty-five degrees. Because the sine term is squared the maximum occurs in each quadrant leading to the four lobed brightness pattern 34. The curve 34 indicates that the orientation of the principal axes of stress from a known angular position 36 can be determined with the plane polariscope but that it is not possible to differentiate between the maximum and minimum shear axes. This is because the slow axis $\sigma_2$ and the fast axis $\sigma_1$ have the same effect of separating light which passes through the polarizer 22 into its two components which allows light to pass through the analyzer 24.

If the polariscope 20 in FIG. 1 is considered with just the polarizer 22, the one-quarter waveplate 26, and the analyzer 24, the effect on the waveplate 26 when oriented forty-five degrees from the polarization axes 30, 32 on the light which passes through the polariscope 20 can be predicted from equation one.

The partial waveplate 26 will have maximum effect when oriented forty-five degrees from the polarization axes. The effect will be to produce a neutral grey field as viewed through the analyzer 24. With the partial waveplate so oriented, maximal stresses will have increased brightness whereas minimal stresses will have decreased brightness allowing them to be differentiated.

The waveplate introduces a birefringence of one-quarter of a wavelength of light between a fast axis F and a slow axis S.

The intensity of light of the grey field polariscope 20 is described by following equation:

$$I = \frac{a^2}{2}(1 + \sin\Delta \sin 2\theta)$$

I is the intensity of light at a selected point on the specimen
a is the amplitude of the source
$\theta$=is the position of the analyzer relative to the fast axes
$\Delta$ represents the relative retardation due to birefringence in the specimen Circularly Polarized Light The physical effect of the partial waveplate 26 is to produce circularly polarized light. Circularly polarized light is plane polarized light where the plane of polarization rotates about a line parallel to the direction of propagation of the light. Circularly polarized light can also be thought of as polarized light where the orientation of the plane of polarization has a probability function evenly distributed about the direction of propagation of the light. Thus when circularly polarized light is viewed through the analyzer 24, only a component of the circularly polarized light will pass through the analyzer 24, producing the neutral grey observed.

Because the plane of polarization is rotating, the polarizer and the one quarter waveplate do not need to rotate in order to produce the light pattern of FIG. 4. Only the analyzer is required to rotate.

When planar polarized light encounterers a second plane polarizing filter the intensity of light which passes through the second filter is proportional to the cosine of the angle between the axis of the polarized light and the axis of the polarizing filter. When circularly polarized light encounterers a plane polarizing filter, the amount of light which passes through the polarizing filter is independent of the orientation of the filter and can be viewed as the summation of all possible orientations times the cosine between each possible orientation and the axis of the polarizing filter. This results in the same light intensity as if the circularly polarized light were planar polarized and oriented forty-five degrees from the axis of the polarizing filter.

The effect of passing circularly polarized light through a birefringent object is to produce elliptically polarized light. Elliptically polarized light has a rotating axis of polarization which changes in magnitude as it rotates. The amount of elliptically polarized light which will pass through a plane polarizing filter depends on the orientation of the major axis of the ellipse with respect to the axis of the plane polarizing filter. The shape of the ellipse, or eccentricity of the ellipse, is dictated by the difference between the major and minor axes of stress, while the orientation of the major axis indicates the direction of those stresses. By determining the shape and orientation of the ellipse the magnitude and direction of the principal stresses $\sigma_1$ and $\sigma_2$ is determined.

Another Approach to Understanding

Another approach to understanding how this determination of the magnitude and direction of the principal axes of stress comes is as follows. When a birefringent specimen 28 is analyzed with the polariscope 20 including the one-quarter waveplate 26 the brightness of a particular point will only reach maximum brightness twice for each rotation of the polariscope 20, as shown in FIG. 4. The maximum brightness of a point on the specimen 28, in the absence of the one-quarter waveplate, occurs when the fast axis or slow axis of the specimen 28 is halfway between the axes 30, 32 of polarization of the polarizer 22 and the analyzer 24.

The one-quarter waveplate is also oriented halfway between the axes 30, 32 of the analyzer 22 and polarizer 24; as the polariscope rotates, the fast axis of the one-quarter waveplate will pass through the fast axis of the specimen 28 just as the fast axis of the specimen is also oriented at forty-five degrees to the axis of the analyzer 22 and polarizer 24 and showing maximum brightness. Thus the effect of the one-quarter waveplate 26 is to increase the brightness maximum caused by the principal or fast axis of the specimen 28.

Contrarily, when the slow axis of the specimen 28 is positioned for maximum brightness, halfway between the axes of the polarizer 22 and the analyzer 24, the fast axis of the one-quarter way plate will be superimposed on the slow axis of the specimen and the net effect will be to minimize the brightness of a point on the specimen 28.

Utilizing the polariscope 20 of FIG. 1, the brightness maximum will correlate to the square of the maximum stress amplitude, and the brightness minimum will correspond to the square of the minimum stress amplitude. The location of the maximum and minimum stress axes can be determined by the orientation of the maximum and minimum light amplitudes with respect to a reference position 36 as shown in FIG. 4.

Because the one-quarter waveplate introduces circularly polarized light, only the analyzer is required to rotate if the one-quarter waveplate is position in the light path before the light reaches specimen. However to minimize irregularities in the optical elements it may be desirable for practical devices to rotate all three elements, the polarizer, the one-quarter waveplate, and the analyzer.

Further Consideration of Circularly and Elliptically Polarized Light

Figure 6:
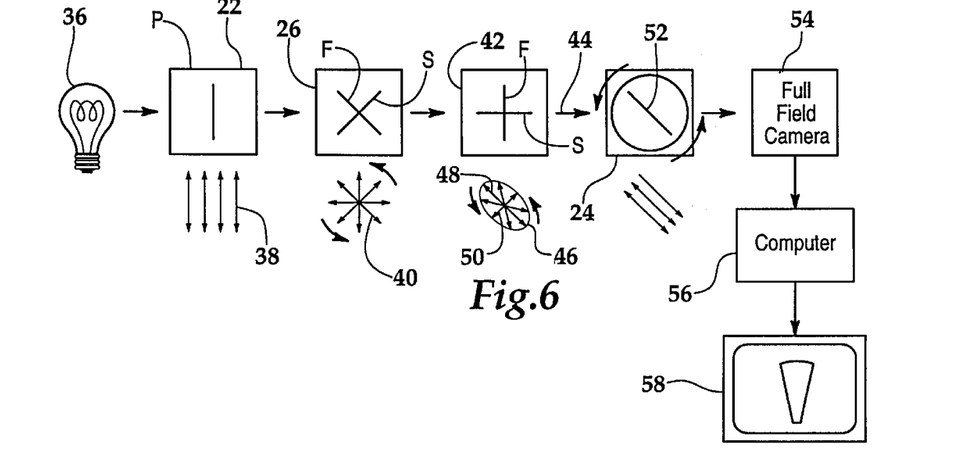
FIG. 6 is a schematic view of the characteristic of light as it transits at each position along the stress analyzer of this invention.

Referring to FIG. 6, the steps whereby light passing through a photoelastic material is used to determine with the aid of a grey field polariscope the shear stresses in the material is depicted. Light from a light source 36 passes through a plane polarizer 22. The resulting light 38 vibrates in a single plane. The light 38 then passes through a one-quarter waveplate 26 which is oriented with the fast axis F inclined forty-five degrees from the orientation of the polarizer 22. This results in the orientation of the planar light 38 rotating in time and space as the light propagates forward.

Circularly polarized light 40 is depicted as a circle of arrows in FIG. 6. The arrows represent the plane of vibration at different points in time. The circularly polarized light 40 then passes through the photoelastic specimen 42 shown in FIG. 1 and 6. The birefringence present in the photoelastic specimen creates elliptically polarized light 44 in which the plane of polarization rotates and the magnitude of the light vector changes depending on the rotational position or angle. The variation of the ellipse 46 from a mean value encodes information about the magnitude and direction of the principal shear stresses. Shear stresses are determined by the difference between the maximum and minimum axes of stress in the specimen.

An analyzer 24 is used to analyze the orientation and shape of the ellipse 46. The analyzer 24 allows only light which is aligned with the axis of polarization 52 to pass through to a camera 54. By rotating the analyzer 24, the amount of light transmitted to the camera 54 assumes a periodic function, as depicted in FIG. 4, with phase and amplitude information which corresponds to shear stress intensity and orientation within the specimen 42. A computer 56 and/or an optical processing box (not shown) analyzes the periodic function for each of a multiplicity of points on the specimen and provides a display 58 of the stresses within the specimen 42.

Although slow scan techniques could be used in the camera 54, the preferred technique will use an array of detectors such as a CCD camera. The computer 56 can also process the output of each detector and, because the signal is periodic as a result of the rotating analyzer, the computer can perform a lock-in operation to improve the signal-to-noise ratio of the light amplitude. Further the computer can be used for calibration and alignment as will be discussed more fully in the description of a particular implementation discussed below.

Description of Preferred Coating Techniques

For optimal flexibility and usefulness it is desirable to detect stresses in solid optically opaque models or real structures. This requires coating the model or test structure with a birefringent coating of known thickness. Preferably the coating will produce a birefringence of one-quarter of a wavelength of light for a maximum stress expected in the model. Spray-on photoelastic coating are known and are available from suppliers such as Measurements Group Inc., P.O. Box 27777, Raleigh, N.C. 27611.

Conventional coatings, however, do not provide a means for determining the coating thickness at all points. Such a determination is necessary for accurate stress measurement. A preferred spray coating is formulated to produce a coating which is of a thickness such that only a quarter wave of birefringence is produced when the maximum stress is imposed on the coated specimen.

Figure 14:
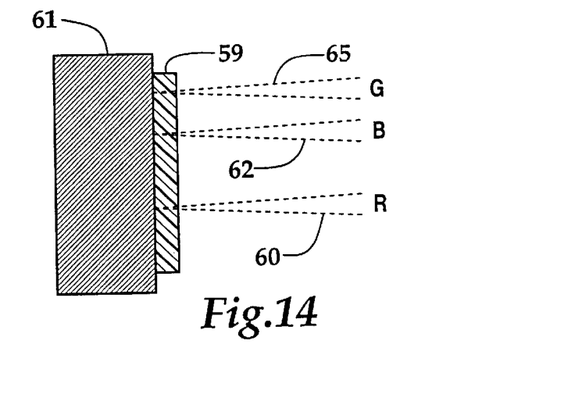
FIG. 14 is an enlarged cross-sectional view of a test specimen with a spray-on coating of birefringent material which differentially absorbs red, blue, and green light.

A dye which selectively absorbs some frequencies of light more then others e.g. red light, is added to a coating 59 which is coated on a specimen 61. As shown in FIG. 14, a red ray of light 60 experiences attenuation due to the dye in the coating 59. A blue ray of light 62 experiences lesser attenuation based on the thickness of the coating. By comparing the relative attenuation between the blue ray of light 62 and the red ray of light 60, the thickness of the coating on the specimen 61 can be determined.

However the attenuation difference between two wavelength of light are not sufficient to solve for coating thickness when all sources of amplitude variation are considered. Possible sources of amplitude variation include surface reflection from the coating, attenuation through the coating due to thickness, and reflection from the surface of the specimen. To solve for the three unknowns three equations are required. An additional green light ray 65 shown in FIG. 14 must be used. In actual practice the camera which receives the light passing through a grey field polariscope will be an red, green, blue (RGB) type. By adding one or more dyes to a photoelastic coating so that the attenuation of the three colors red, greet, blue are each substantially different, and of a known amount, the RGB camera will be able to provide sufficient data to solve for coating thickness, surface of coating reflected and reflection from the surface of the specimen.

Typical photoelastic materials are plastic and thus, over time, stresses induced in them are removed by creep. This can make testing time critical and make difficult the monitoring of stresses over long periods of time. However the new techniques disclosed herein for detecting shear stresses in an object which is coated with a photoelastic material are very sensitive and relatively little birefringence is required to produce the desired one-quarter wave retardation between the fast and slow axes within the photoelastic coating.

Figure 13:
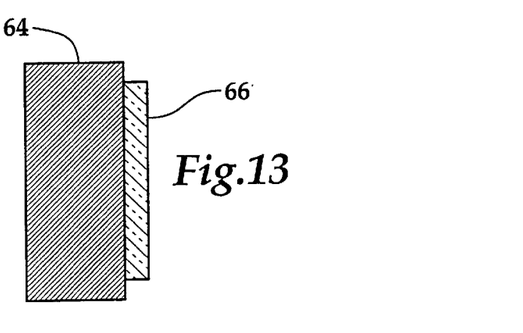
FIG. 13 is a cross-sectional view of an aluminum test specimen with an aluminum oxide birefringent coating developed thereon.

This improved sensitivity allows the use of coatings which have not previously been recognized by the art as suitable for use in photoelastic stress analysis. Aluminum naturally forms a thin oxide coat which is composed of aluminum oxide or the mineral corundum. This coat is extremely hard and exhibits sufficient birefringence that the oxide formed on bare metal, or as enhanced by the anodizing process, provides an excellent coating for determining stresses with the method of this invention. Aluminum oxide coatings from less then 0.001 inches to 0.003 inches or more can be produced and provide the fractional wavelength birefringence typically by required the technique disclosed herein but of no use to classical techniques because of a lack of sensitivity. FIG. 13 illustrates an aluminum substrate 64 with an aluminum oxide coating 66 formed thereon.

The chemical processes for producing anodized coatings tend to result in a uniformly coated part. Further, aluminum is routinely applied to material surfaces by vapor deposition with high tolerances in coating thickness. The inherent ability to produce a uniform coating thickness of aluminum oxide on aluminum or non-aluminum test specimens, combined with the high durability and resistance to creep or abrasion of such specimens, provides the possibility of long term monitoring of stresses. For example, a landing strut constructed of high strength steel alloy could be coated with aluminum and anodized. Periodically, or after a hard landing, induced stresses in the strut would be determined by viewing the strut with the process disclosed herein. The unloaded part would show residual strain in the part. Testing the part while loaded would show any change in the way the part responded to loads which could for example indicate a developing flaw in the part.

The technique of photoelastic stress analysis disclosed herein makes possible a wide range of coating approaches, whether chemically or vapor deposited, which have desirable properties such as durability and resistance to creep.

Examples of Specific Devices

Figure 2:
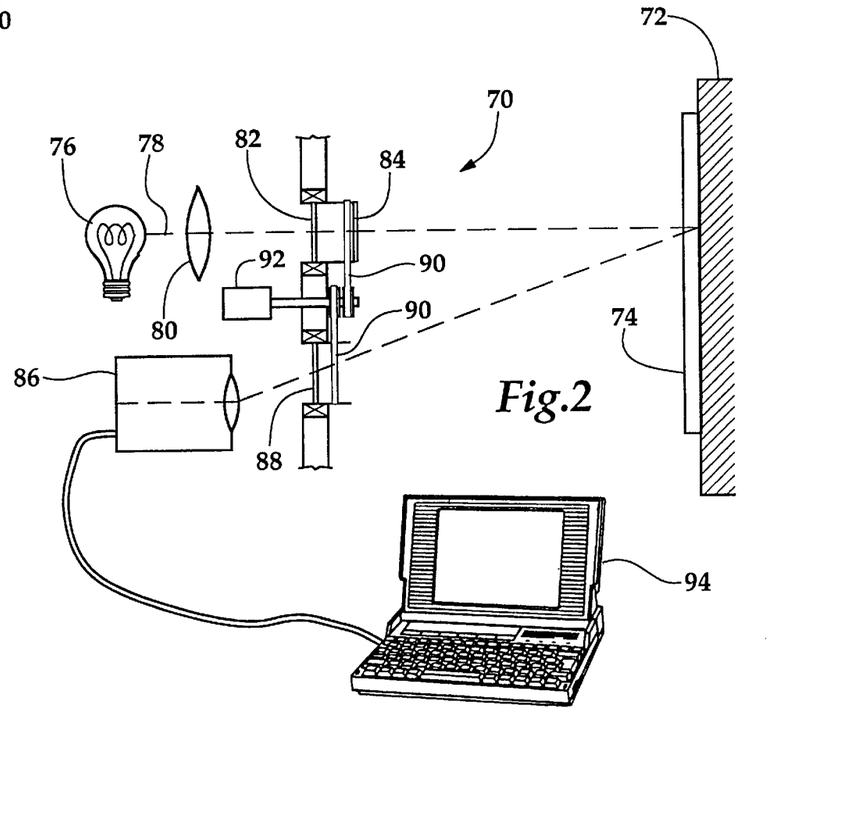
FIG. 2 is a schematic view of a stress analyzer of this invention for use with a light reflective specimen.

A grey field polariscope 70 employing the principles discussed herein is shown in FIG. 2. A specimen 72 has a thin layer of photoelastic material 74 formed or deposited on its surface. The specimen 72 is subjected to the load condition for which it is desired to determine the shear stresses in the specimen 72. The polariscope 70 has a light source 76 which supplies light 78 which is focused through a condenser lens 80. The light 78 passes through a rotating polarizer 82 and a corotating one-quarter waveplate 84 which has its fast axis offset from the plane of polarization by forty-five degrees. The light 78 which is now circularly polarized is reflected from the specimen 72 through the photoelastic coating 74. The stresses in the photoelastic coating 74 changed the circularly polarized light into elliptically polarized light.

The specimen 72 is viewed by a CCD array camera 86 which looks through a rotating analyzing polarizer 88. The analyzer 88, the polarizer 82 and the one-quarter waveplate 84 can be driven by belts 90 which are driven by a common motor 92. Because the light passing through the polarizer 82 and the one quarter waveplate 84 is circularly polarized, the rate of rotation of the analyzer need not be the same as that of the polarizer and one-quarter waveplate. However it may be advantageous if all optical elements are rotated at a same rate so that any inconsistencies in the optical system will not change.

The output of the CCD camera is fed to a computer 94 where a lock-in may be performed on the periodic varying brightness of each pixel. The lock-in can provide extremely accurate information about phase and brightness variation of each pixel. A lock-in is a well known computation technique which permits accurate analysis of time varying signals, such is disclosed in my U.S. Pat. No. 5,201,582 the disclosure of which is hereby incorporated by reference herein.

The phase information is directly related to the orientation of the major axis of the elliptically polarized light received from the specimen 72 and the magnitude of the light intensity at the maximum is proportional to the shear stress at a point on the specimen 72 corresponding to a particular pixel.

FIGS. 7–12 show various optical implementations of the method of this invention.

Figure 7:
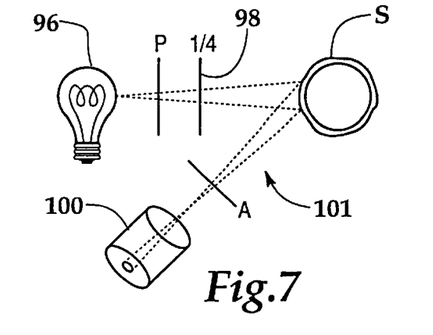
FIG. 7 is a simplified schematic view of stress analyzer of FIG. 2.

The apparatus of FIG. 7 is schematic of a grey field polariscope 101 similar to the polariscope 70 shown in FIG. 2. A light source 96 passes light through a plane polarizer P a one-quarter waveplate 98 reflects a specimen S and is viewed through an analyzer polarizer by a CCD camera 100. In the optical setup of FIG. 7 only the analyzer A is required to rotate because the specimen S is illuminated with circularly polarized light.

Figure 8:
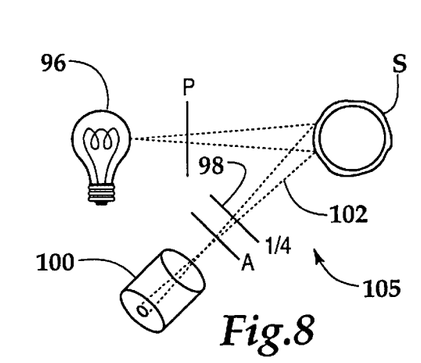
FIG. 8 is a schematic view of alternative embodiment stress analyzer of FIG. 2 wherein the one-quarter waveplate is placed adjacent to the analyzer.

FIG. 8 shows a similar optical arrangement, grey field polariscope 105 where the one-quarter waveplate 98 is positioned in the light path 102 after the light has reflected from the specimen S. In this example all three components of the optical system may be made to rotate. Or the polarizer P alone may rotate.

Figure 9:
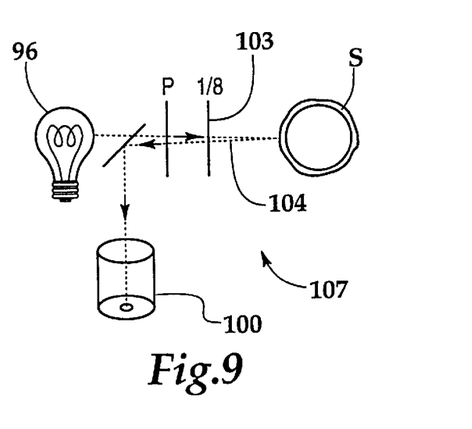
FIG. 9 is a schematic view of a further alternative embodiment stress analyzer of this of this invention having folded light path.

FIG. 9 shows a compact optical system grey field polariscope 107 employing a single plane polarizer P and a one-eighth waveplate 103. The light path 104 passes through the optical elements P and the one-eighth waveplate 103 twice. A beam splitter 106 allows light from the source 96 to be transmitted along the same optical path 104 as the camera 100 observes.

Because the polarizer P acts as the analyzer, it must rotate, which means the one-eighth waveplate 103 will rotate with the polarizer P. This configuration would lend itself to a compact optical instrument which would illuminate and view the test specimen with a minimum of optical opponents and would package compactly.

Figure 10:
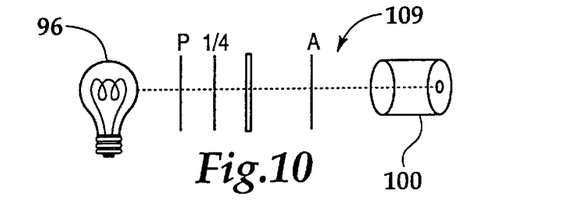
FIG. 10 is a schematic view of a still further alternative embodiment stress analyzer of this invention similar to FIG. 2 but for use with a transparent specimen.

FIG. 10 shows an optical system grey field polariscope 109 similar to that shown in FIG. 7 only the specimen is a transmission specimen. Again only rotation of the analyzer A is required for the system illustrated in FIG. 10 because the light passing through the specimen S is circularly polarized.

Figure 11:
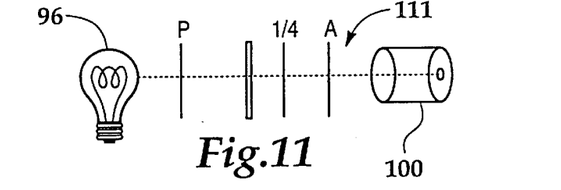
FIG. 11 is a schematic view of an additional alternative embodiment stress analyzer of this invention similar to FIG. 8 but for use with a transparent specimen.

FIG. 11 shows a transmission grey field polariscope 111 optical system similar to the reflection optical system shown in FIG. 8.

Figure 12:
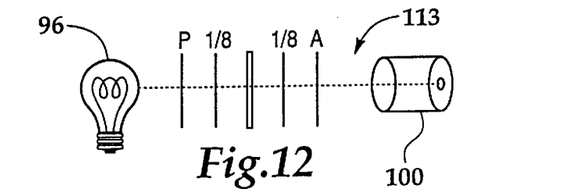
FIG. 12 is a schematic view of yet another alternative embodiment stress analyzer of this invention for use with a transparent specimen employing an optical system similar to FIG. 9.

FIG. 12 shows a transmission optical system grey field polariscope 113 similar to the reflection optical system shown in FIG. 9.

A Full Field Shear Stress Measuring Instrument Without Moving Parts

The discussion to this point assumes that at least the analyzer is required to rotate in order to assess the phase angle of the elliptically polarized light which is reflected or transmitted from the specimen. However this is only one way in which the orientation and shape of the elliptically polarized light from each point on a specimen can be analyzed.

Figure 15:
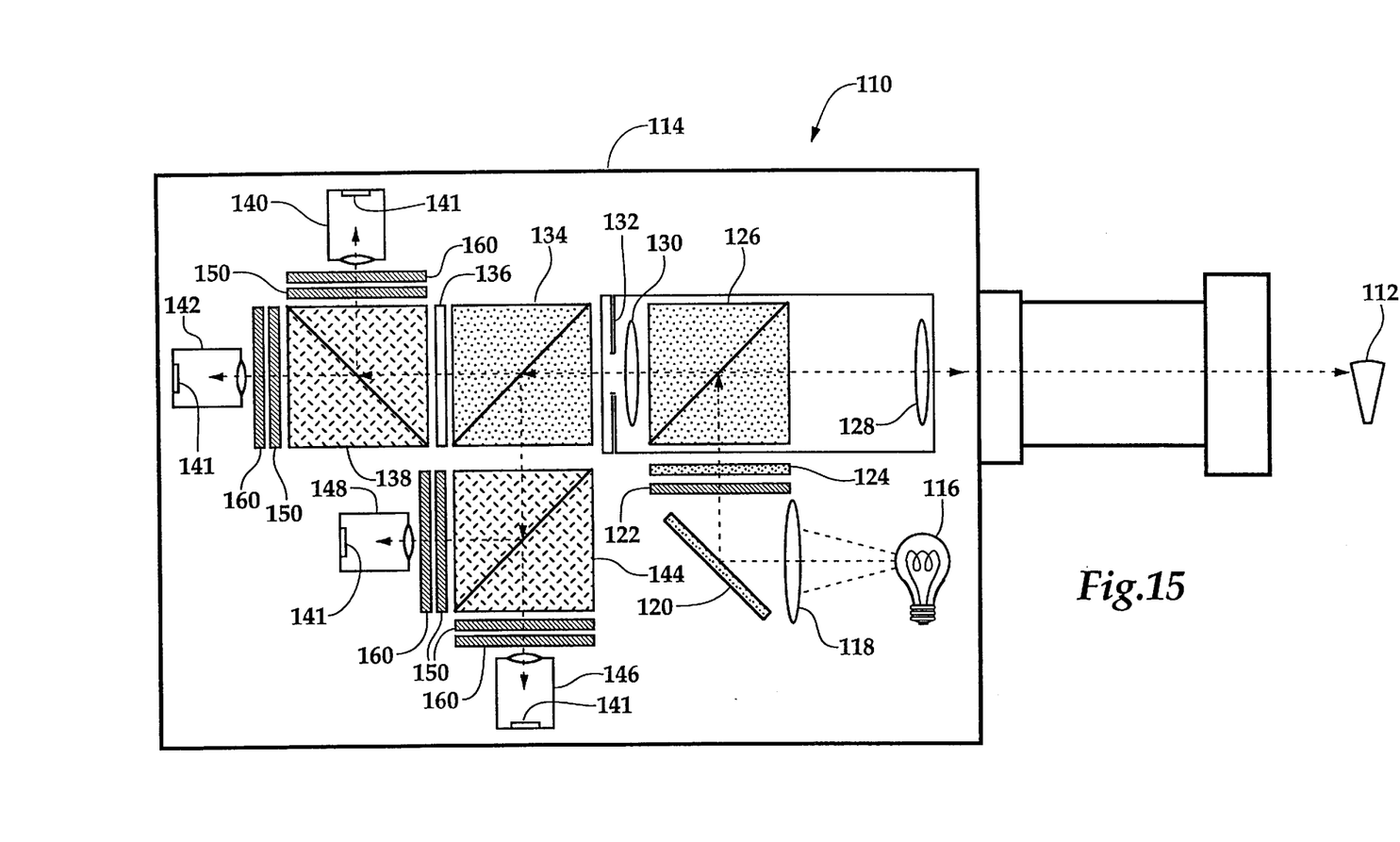
FIG. 15 is a top plan view of a grey field polariscope without moving components.

Another approach is to view the elliptically polarized light reflected from the specimen through at least three plane polarizers with different orientations. As shown in FIG. 15, a grey field stress analyzing instrument 110 of this invention utilizes beam splitters to view a specimen 112 with four cameras at four polarizer orientations spaced forty-five degrees apart.

The instrument 110 has a housing 114 which houses a light source 116 which passes through a lens 118 to project a beam of parallel rays. The beam is reflected off a mirror 120 through a plane polarizer 122 and a one-quarter waveplate 124. The circularly polarized light thus created is directed by a nonpolarizing beam splitter 126 through an optical element represented by lens 128 which projects the light onto the specimen 112 and receives light which is imaged by the four cameras. The circularly polarized light is thus projected onto the specimen 112. Reflected light passes through the same optical element formed by the lens 128 passes straight through the beam splitter 126.

An additional lens 130 and an aperture stop 132 provide a clean image to a second beam splitter 134. The second beam splitter 134 splits the light into two identical beams. One beam is directed through a one-half waveplate 136 which effectively rotates the light passing through it forty-five degrees. The light passing through the one-half waveplate 136 enters a first polarizing beam splitter 138 which splits the light into two orthogonal polarized beams. Each beam is then imaged by a CCD array 141 in each camera 140 and 142.

The light which does not pass through the one-half waveplate 136 similarly is split by a second polarizing beam splitter 144. The output of the second polarizing beam splitter 144 is viewed by a third camera 146 and a fourth camera 148. Hence four cameras 140, 142, 146, 148 simultaneously view the same test specimen 112. The third camera 146 views the specimen 112 through a polarized filter which is oriented between the polarized light viewed by the first and second camera 140, 142. The light through the fourth camera 148 is one-hundred and thirty4ive degrees away from the angle of polarization of the first camera.

The instrument 110 efficiently utilizes the light received from the test specimen. Essentially all the light received by the instrument 110 from the test specimen 112 is received by the four cameras which have high quantumefficiency CCD array detectors. The polarizing beam splitters 138, 144 efficiently split the light passing through them into two beams without blocking any light. The polarizing beam splitters are not completely efficient and, for example, a small percentage of the light which passes to the first camera 140 is not polarized in the desired plane. Thus plane polarizers 150 are positioned in front of each camera to clean up the light passing through each side of the beam splitters.

An additional polarizer 160 may be positioned in front of each camera to balance the amount of light passing into each camera. However, balancing the intensity of each image is probably better performed in the computer manipulation of the output of the CCD.

If rotating components are eliminated the problem which may be associated with rotating, such as vibration, wear, maintenance can be eliminated. The grey field instrument 110 splits the light reflected from the structure 112 so it can be viewed through four analyzer each oriented forty-five degrees apart. This provides four samples which could be gotten sequentially by sampling light passing through a rotating analyzer. With a rotating analyzer many discrete images are obtained and processed to extract the required information concerning the brightness variations of the sample as viewed through a grey field polariscope. Because the output signal is a simple sine function four samples are sufficient to characterize the brightness variation on the structure 112. However if necessary additional beam splitters combined with one-half waveplates could provide as many samples as necessary to characterize the elliptically polarized light received from the structure 112.

The alignment of the instrument 110 is quite simple. A standard test pattern is placed in the field of view and the images obtained by the four cameras can be aligned electronically. With the size of modern CCD arrays and the required resolution of shear stresses within the specimen, a considerable excess in detector capability and resolution exists so that the cameras may be aligned by correlating the illuminated CCD elements with the test pattern. This simple computer alignment which could be performed manually or by an automatic computer routine may be contrasted with the difficulty of aligning instruments which utilize interferometry photoelastic techniques.

A computer (not shown) alone or combination with a specialized electronics box receives the output of the CCD cameras and processes the output of the CCD to determine the shear stresses imaged by the instrument 110. The computer (not shown) may also control any automated features of the instrument 110. The computer performs the necessary calibrations of the CCD arrays including compensating for alignment and optical effects.

The grey field polariscope 110 can be rapidly and repeatedly calibrated electronically. Not only in alignment and sensitivity of each sensor in each camera but also in its proper ability to measure birefringence. For example a silvered one-eighth waveplate on which the fast and slow axes are labeled can be imaged and any defect or variation in the optics of the polariscope 110 checked and zeroed out. In addition, the orientation of the maximum shear stresses can be checked again the one-eighth waveplate with its clearly labeled optical axes. The grey field polariscope is not only an extremely sensitive instant but one which is inherently easily calibrated and aligned. The calibration device such as a one-eighth waveplate does not have to be silvered but can be placed in front of a mirror or other reflective but birefringent free surface.

It is important that an instrument which will be used by engineers as a tool in the field as well as the laboratory be amenable to setup and alignment procedures which are not excessively rigorous or taxing. The instrument 110 provides the compact packaging, self alignment and calibration necessary in a device which will be used in everyday design, test, and maintenance situations. Further during long term tests, the ability to check calibration periodically without moving the instrument 110 or making any mechanical adjust improves the reliability of the data collected.

The light received by the four cameras 140, 142, 146, 148 can be averaged to give the total flux from each discrete area on the model. This allows correction for non-uniformity of the illuminating light. Further it allows correction for model dependent characteristics such as an off axis viewing of three dimensional surfaces. If three color CCD array cameras are used the total light flux in each color from each discrete area on the model can be determined and used to calculate the thickness of a coating wavelength dependent attenuation of light as discussed above.

The grey field polariscope 110 because it takes sufficient images to determine shear stresses simultaneously can operate at high speeds. A flash lamp for example could provide sufficient light to freeze the shear stresses in the anodized coating aluminum plate which is being impacted by a bullet. And imaging can be performed on components of dynamic structures. For example the stresses in a turbine blade caused by centrifugal forces can be image while the blade rotates.

The grey field polariscope 110 while providing the desirable feature of providing full field shear stress images of static structures can be used to provide continuous imaging of dynamic structures. A lock-in on the dynamic images can provide an image of peak dynamic shear stresses.

An additional function which can be incorporated into the method of stress analysis disclosed herein is to view the specimen through the rotating analyzer alone while the specimen is illuminated with non-polarized light. A single rotating plane polarizing filter will produce changes in model brightness only if reflected light has been polarized by the model or any coatings thereon. The well known use of polarizing glasses to reduce glare illustrates the polarization of light caused by reflection. This type of polarization can be mistaken for birefringence with standard analysis techniques.

By first viewing the object and determining the amount of polarization induced by reflection such induced polarization can be subtracted from the results produced when the specimen is illuminated with circularly polarized light. With this technique higher resolution is possible.

Additionally the polarization data can be used to determine an angle of incidence between the light beam and the model which can lead to the ability to image shear stresses on complicated models. Typically with conventional stress analysis off angle viewing is limited to about 10 degrees. With the technique of this invention, considerably greater oblique viewing may be possible.

The instrument 110 shown in FIG. 15 can determine non-photoelastic induced polarization without rotating the analyzer by simply providing for the polarizer 122 and one-quarter waveplate 124 to be manually or automatically removed from the light path between the light source 116 and the specimen 112.

Likewise the instrument 70 in FIG. 2 can incorporate this feature by allowing the polarizer 82 and one-quarter waveplate 84 to slide or swing out of the light path 78. The embodiment shown in FIG. 9 requires only the removal of the one-eighth waveplate 103. It is therefore easily arranged in all the various embodiments to remove the optical elements which generate the circularly polarized light so that the specimen induced polarization can be determined and subtracted from the stress analysis images.

Another approach to correct for reflection induced polarization is to image the photoelastic coating with both left- and right-handed circularly polarized light. By adding the images thus produced the effects of reflection-induced polarization are eliminated and intensity of the stress induced birefringence is doubled. The direction of rotation of the circularly polarized light is controlled by the angular placement of the fast axis of the one-quarter wave plate with respect to the axes of polarization of the first polarizer. Thus by changing the orientation of the one-quarter wave plate by ninety degrees, from forty-five degrees to the right of the polarizer axis, to forty-five degrees to the left of the polarizer axis, the rotation of the circularly polarized light is reversed.

Rotating the one-quarter waveplate is even simpler to implement than removing the one-quarter wave plate and the polarizer from the optical path.

It should be understood that any mathematical lock-in algorithm can be used to increase the sensitivity of the instruments to the brightness changes on the model which are due to induced birefringence. It is also possible to filter the four images produced by the instrument 110 to extract only those variations between images which are consistent with the underlying physical phenomenon. It is also apparent that additional images taken at other angles could be incorporated in the instrument 110 and that if sufficient images are taken they approach a continuous rotating analyzer for purposes of performing lock-in on the brightness variations present in the specimen.

The method of photoelastic stress analysis discussed herein can be used with multiple fringe stresses in coatings on test specimens. Increasing the load on the specimens gradually while repeatedly performing full field analysis allows computer tracking of the shear stress information between or in front of fringe lines as they develop and move across the specimen. Thus the sub fringe technique disclosed herein is a special case of a more general technique which employs a lock-in algorithm and tracks sub fringe brightness changes as a specimen is loaded to determine stresses within a specimen.

Although most applications of the disclosed photoelastic stress analysis technique will employ models or specimens with coated surfaces there are specialized uses for transmission specimens. For example a process such as shown in FIGS. 10 through 12 could be used to detect residual stresses in glass. For example the weak birefringence in automobile windows is ideal for determining residual stresses in the windows as manufactured by a sub fringe transmission technique.

The techniques and apparatuses disclosed herein for analyzing the elliptically polarized light are directed to determining the variation in intensity between the average intensity and the minimum and maximum intensity. This is illustrated in FIG. 4 where a two $\omega$ plot 162 of light intensity is shown. This is in contrast to earlier techniques which produced a four $\omega$ plot such as shown in FIG. 3 or produced outputs which combined four $\omega$ signals with two w signals. Further, earlier techniques involved solving for the absolute magnitude of the axes of the ellipse whereas the techniques disclosed herein require finding only the difference between an elliptically, or preferably circularly, polarized reference, and an observed elliptically polarized light.

Many techniques are available for finding this variation in brightness and its phase angle $\beta$ shown in FIG. 4. If the analyzer is rotating, a lock-in algorithm may be employed which is basically related to considering the signal in the frequency domain by, for example, employing a Fourier transform. Other techniques which use the periodicity of the signal to better extract the desired information could be used. Further, where a device such as the instrument 110 shown in FIG. 15 is employed, the extraction of the signal is a mathematical operation on the four images obtained which assumes the signals are sinusoidal and four samples of that signal are available for processing. And it is understood that the claims are not limited to a particular signal processing algorithm or technique but are directed generally to the process of obtaining multiple images and extracting the information concerning brightness variation and phase which correlates with maximum shear stress magnitude and orientation.

It should be understood that the photoelastic effect is produced by strain in the photoelastic material and, because the determined value, i.e. the difference between the fast and slow axes in the photoelastic material, is directly proportional to the shear stresses in the material, for simplicity the description speaks to the observation of shear stresses, although physically only strain produces observable phenomenon.

It should be understood that a monochromatic light source may be used or white light they be used in any of the grey field polariscopes described herein.

It should be understood that circularly polarized light is a special case of elliptically polarized light where the eccentricity of the ellipse is zero. And It should be understood that practical optical components will not produce perfectly circular polarized light.

It is understood that the invention is not limited to the particular construction and arrangement of parts herein illustrated and described, but embraces such modified forms thereof as come within the scope of the following claims.

I claim:

1. A method for determining shear stresses in a structure comprising the steps of:

coating a structural specimen with a photoelastic material;

loading the structural specimen to produce no more than one-half of a wavelength of birefringence in the photoelastic material;

illuminating with elliptically polarized light the structural specimen coated with the photoelastic material to cause a multiplicity of discrete areas on the structure to reflect elliptically polarized light;

creating an electronic image of a portion of the structural specimen including the multiplicity of discrete areas;

analyzing the elliptically polarized light reflected from the multiplicity of discrete areas of the illuminated specimen to determine the orientation and magnitude of major and minor axes of the elliptically polarized light reflected from each of said multiplicity of specimen areas; and processing the orientation and magnitude of major and minor axes of the elliptically polarized light for each analyzed area to produce a result indicative of shear stress magnitude and direction in the specimen at each discrete area.

2. The method of claim 1 wherein the structure is illuminated with circularly polarized light.

3. The method of claim 1 wherein the step of analyzing the reflected light at a multiplicity of discrete areas comprises:

rotating a plane polarizer placed to receive the reflected elliptically polarized light from the specimen;

creating the electronic image of the specimen by forming an image of the specimen on an array of light detectors from light transmitted through the rotating plane polarizer; and analyzing amplitude variation and phase relationship of the light received from each of said multiplicity of discrete areas onto individual light detectors in the array.

4. The method of claim 3 further comprising the step of performing a lock-in operation on the output of each individual light detector in the array which receives light from one of said discrete areas on the specimen, the lock-in processing the data from the light detectors with information of the rotation rate of the rotating plane polarizer and determining phase angle of maximum brightness of each area on the specimen and the magnitude of maximum brightness.

5. The method of claim 1 wherein the specimen has a surface of aluminum and is coated with a photoelastic material by forming an oxide coat on the aluminum surface.

6. The method of claim 5 wherein the oxide coat is of the type formed by an anodizing process.

7. The method of claim 1 wherein the photoelastic material exhibits less that about one-quarter of a wavelength of birefringence.

8. A method for determining shear stresses in a structure comprising the steps of:

coating a structural specimen with a photoelastic material;

loading the structural specimen to produce no more than one-half of a wavelength of birefringence in the photoelastic material;

illuminating with elliptically polarized light the structural specimen coated with the photoelastic material;

analyzing the light reflected from a multiplicity of discrete areas of the illuminated specimen to determine amplitude variations in light reflected from each of said multiplicity of specimen areas and the phase relationship of the amplitude variation in light from each specimen area; and processing the amplitude variation and phase relationship for each analyzed area to produce a result indicative of shear stress magnitude and direction in the specimen at each discrete area;

wherein the specimen is coated with a photoelastic material, wherein the coating is formulated to attenuate a first wavelength of light to a greater extent than it attenuates a second wavelength of light; and further comprising the steps of:

illuminating the photoelastic material coating with light of the first wavelength and light of the second wavelength and comparing the relative attenuation of the first wavelength to the second wavelength at the multiplicity of discrete areas on the surface of the specimen so as to determine the thickness of the coating at said multiplicity of discrete areas; and wherein the step of analyzing the reflected light at the multiplicity of discrete areas includes the step of correcting for the determined thickness at each of said discrete areas.

9. A method of determining the stresses in a transparent birefringent object comprising the steps of:

passing elliptically polarized light through a birefringent object which has been stressed to exhibit a stress induced birefringence of less than one-half wavelength of light so light passing through the birefringent object is elliptically polarized;

obtaining multiple digital images of the elliptically polarized light transmitted through a multiplicity of discrete areas of the birefringent object wherein each digital image is taken through a linear polarizing filter of different orientation;

analyzing the multiple digital images in a digital computer to determine variations in amplitude of the elliptically polarized light transmitted from each of the multiplicity of discrete portions of the surface of the object and the phase of said variations in amplitude of the elliptically polarized light; and calculating the stress magnitude and direction at each discrete portion of the surface from the determined variation in amplitude and phase of the elliptically polarized light transmitted from each discrete portion of the surface of the object.

10. The method of claim 9 wherein the step of passing elliptically polarized light through the birefringent object is performed with circularly polarized light.

11. A method of measuring magnitude and direction of stresses in an object comprising the steps of:

applying to a surface portion of an object a birefringent coating which attenuates light of a first wavelength and which attenuates light of a second wavelength to a greater extent than the first wavelength;

determining the thickness of the coating at a multiplicity of discrete areas on the object by illuminating the coating with light composed of the first wavelength and the second wavelength and calculating thickness based on differences in attenuation of the first and second wavelengths;

illuminating at least a portion of the birefringent coated portion of the surface of the object with elliptically polarized light; and determining for a multiplicity of discrete areas within the illuminated portion an amplitude variation and phase angle of said amplitude variation of elliptically polarized light reflected through the birefringent coating on each of the multiplicity of discrete areas.

12. The method of claim 11 wherein the elliptically polarized light is circularly polarized.

13. The method of claim 11 further comprising the step of determining the magnitude and orientation of shear stresses from the amplitude variation and phase angle of each of the multiplicity of discrete areas.

14. The method of claim 11 wherein the step of determining for a multiplicity of discrete areas within the illuminated portion an amplitude variation and phase angle of said amplitude variation of the elliptically polarized light includes imaging the multiplicity of discrete areas through a rotating planar polarizing filter and determining the maximum light amplitude and a phase angle for that amplitude from a selected orientation of the polarizing filter for each of the discrete areas.

15. The method of claim 11 wherein the step of determining for a multiplicity of discrete areas within the illuminated portion an amplitude variation and phase angle of said amplitude variation of the elliptically polarized light at each of the multiplicity of discrete areas comprises:

imaging the multiplicity of discrete areas through at least three plane analyzers at different orientations; and determining the maximum light amplitude and a phase angle for that amplitude from the images obtained through the at least three plane analyzers.

16. A method of determining the stresses in an object comprising the steps of:

coating a surface of an object in which the stresses are to be measured with a birefringent coating;

loading the object with a stress inducing load to produce no more than one-half of a wavelength of birefringence in the coating;

illuminating the coated surface with elliptically polarized light so light reflected from the surface through the coating is elliptically polarized;

obtaining multiple digital images of the elliptically polarized light reflected from a multiplicity of discrete areas on the surface, wherein each digital image is taken through a linear polarizing filter of different orientation;

analyzing the multiple digital images in a digital computer to determine the variation in intensity of the elliptically polarized light reflected from each of the multiplicity of discrete portions of the surface of the object and the phase angle of said intensity variations in the elliptically polarized reflected light; and calculating the stress at each discrete portion of the surface from the determined variation in intensity and phase angle of the polarized light reflected from each discrete portion of the surface of the object.

17. The method of claim 16 wherein the elliptically polarized light with which the surface is illuminated is circularly polarized light.

18. A method of determining stresses in a photoelastic structure comprising the steps of:

coating a structural specimen with a photoelastic material;

illuminating the coating on the structure with non-polarized light;

before loading the structure, determining for each of a multiplicity of discrete areas on the structure induced polarization of the light reflected from each discrete area followed by;

illuminating the structure with elliptically polarized light;

loading the structural specimen to produce no more than one-half of a wavelength of birefringence in the plastic material;

creating an electronic image out of a portion of the structure including the multiplicity of discrete areas;

determining for each of the multiplicity of discrete areas on the structure, the direction and magnitude of the ellipse major axis of the elliptically polarized light reflected from each of said multiplicity of discrete areas of the specimen; and combining with the direction and magnitude of the ellipse major axis, the determined induced polarization of reflected light, to produce a result indicative of shear stresses in the specimen at each discrete area.

19. The method of claim 18 wherein the elliptically polarized light is circularly polarized light.

20. A method of determining shear stress in a specimen comprising the steps of:

chemically altering a surface portion of an object to impart birefringent properties to said surface portion;

loading the object to produce stress induced birefringence in the chemically altered surface portion of the object;

illuminating the chemically altered surface with elliptically polarized light;

analyzing the light reflected from the chemically altered surface portion and determining an orientation and amplitude variation of the elliptically polarized light from each of a plurality of discrete areas on the surface portion of the object.

21. The method of claim 20 wherein the step of chemically altering the surface is performed by oxidation and wherein the surface of the specimen is aluminum.

22. The method of claim 20 wherein the specimen surface is aluminum and the step of chemically altering the surface comprises forming an anodized coating on the specimen surface.

23. The method of claim 20 further comprising the step of determining from the orientation and amplitude variation of the elliptically polarized light reflected from each of the plurality of discrete areas, the magnitude and direction of shear stresses in the surface portion of the object.

24. A method of determining stress in a specimen having an aluminum surface comprising the steps of:

oxidizing an aluminum surface of a specimen to produce a transparent birefringent coating thereon;

loading the specimen to produce birefringence in the transparent birefringent coating;

illuminating the transparent birefringent coating with elliptically polarized light; and analyzing light reflected from the transparent birefringent coating and determining an orientation and amplitude variation of the elliptically polarized light from each of a plurality of discrete areas on the surface portion of the object.

25. A method of determining stress in a specimen comprising the steps of:

applying a birefringent coating to a surface of a specimen wherein the coating is formulated to attenuate a first wavelength of light to a greater extent than it attenuates a second wavelength of light;

illuminating the birefringent coating with light of the first wavelength and light of the second wavelength and comparing the relative attenuation of the first wavelength to the second wavelength at a multiplicity of discrete areas on the surface of the specimen so as to determine the thickness of the coating at said multiplicity of discrete areas;

determining the amount of induced birefringence in the coating at the multiplicity of discrete areas and correcting the observed birefringence for the determined thickness at each of said multiplicity of discrete areas; and determining shear stress in the specimen at said multiplicity of discrete areas from said corrected observed birefringence.

26. The method of 25 wherein the coating is formulated to attenuate a third wavelength of light by an amount different from the first wavelength, and unlike the second wavelength of light, and wherein the illuminating of the birefringent coating is with light containing the third wavelength of light, and wherein the step of comparing the attenuation of the first wavelength to the second wavelength includes comparing the third wavelength.

27. A method for determining shear stresses in a structure comprising the steps of:

coating a structural specimen with a photoelastic material;

illuminating with right-handed elliptically polarized light the coated structural specimen;

illuminating with left-handed polarized light the coated specimen;

adding the right-handed elliptically polarized light and the left handed elliptically polarized light reflected from the structural specimen to produce a summed light;

analyzing the summed light reflected from a multiplicity of discrete areas of the illuminated specimen to determine amplitude variations in light reflected from each of said multiplicity of specimen areas and the phase relationship of the amplitude variation in light from each specimen area; and processing the amplitude variation and phase relationship for each analyzed area to produce a result indicative of shear stress magnitude and direction in the specimen at each discrete area.

28. The method of claim 27 wherein the left-handed elliptically polarized light and the right-handed elliptically polarized light are circularly polarized.

* * * * *